(12) United States Patent
Hendrix et al.

(10) Patent No.: US 11,351,436 B2
(45) Date of Patent: Jun. 7, 2022

(54) HYBRID GOLF LAUNCH MONITOR

(71) Applicant: Garmin Switzerland GmbH, Schaffhausen (CH)

(72) Inventors: David M. Hendrix, Olathe, KS (US); Caleb A. Pinter, Overland Park, KS (US); Elliot S. Wilder, Prairie Village, KS (US); Jeffrey B. Wigh, Olathe, KS (US); Maxwell C. Goldberg, Overland Park, KS (US); William Perry Copus, Jr., Warrensburg, MO (US)

(73) Assignee: Garmin Switzerland GmbH

( * ) Notice: Subject to any disclaimer, the term of this patent is extended or adjusted under 35 U.S.C. 154(b) by 99 days.

(21) Appl. No.: 16/890,186

(22) Filed: Jun. 2, 2020

(65) Prior Publication Data
US 2020/0398138 A1 Dec. 24, 2020

Related U.S. Application Data

(60) Provisional application No. 62/865,551, filed on Jun. 24, 2019.

(51) Int. Cl.
*A63B 69/36* (2006.01)
*A63F 13/213* (2014.01)
(Continued)

(52) U.S. Cl.
CPC ...... *A63B 69/3658* (2013.01); *A63B 24/0021* (2013.01); *A63B 71/0622* (2013.01);
(Continued)

(58) Field of Classification Search
CPC ............ A63B 69/3658; A63B 24/0021; A63B 71/0622; A63B 2024/0031; A63B 2024/0034; A63B 2071/0625; A63B 2071/0694; A63B 2102/32; A63B 2220/05; A63B 2220/807; A63B 2220/808; A63B 2220/89; A63B 2220/40; A63B 2220/806;
(Continued)

(56) References Cited

U.S. PATENT DOCUMENTS 6,816,185 B2 11/2004 Harmath
8,189,857 B2 5/2012 Johnson et al.
(Continued)

OTHER PUBLICATIONS

ErnestSports® ES 20/20 User's Manual, published prior to Jun. 2, 2020.
(Continued)

*Primary Examiner* — Jeffrey S Vanderveen
(74) *Attorney, Agent, or Firm* — Samuel M. Korte; Max M. Ali

(57) ABSTRACT

A golf launch monitor is configured to determine a flight characteristic of a golf ball. The golf launch monitor includes two low-speed cameras, a trigger device, and a processor. The trigger device is configured to detect a golf swing. The processor is configured to instruct, upon the trigger device detecting said golf swing, the first camera to capture the first ball image; instruct the second camera to capture the second ball image after a time interval, wherein the time interval is less than the first frame rate and the second frame rate; and determine, based at least in part on the first ball image and the second ball image, the flight characteristic of the golf ball.

24 Claims, 8 Drawing Sheets

(51) Int. Cl.
*A63F 13/573* (2014.01)
*A63F 13/812* (2014.01)
*A63B 24/00* (2006.01)
*A63B 71/06* (2006.01)
*A63B 102/32* (2015.01)

(52) U.S. Cl.
CPC .......... *A63F 13/213* (2014.09); *A63F 13/573* (2014.09); *A63F 13/812* (2014.09); *A63B 2024/0031* (2013.01); *A63B 2024/0034* (2013.01); *A63B 2071/0625* (2013.01); *A63B 2071/0694* (2013.01); *A63B 2102/32* (2015.10); *A63B 2220/05* (2013.01); *A63B 2220/807* (2013.01); *A63B 2220/808* (2013.01); *A63B 2220/89* (2013.01); *A63F 2300/1087* (2013.01); *A63F 2300/646* (2013.01); *A63F 2300/8011* (2013.01)

(58) Field of Classification Search
CPC .......... A63B 24/0003; A63B 2071/024; A63B 2220/12; A63B 2220/24; A63B 2220/30; A63B 2220/34; A63B 2220/35; A63B 2220/72; A63B 2220/75; A63B 2220/803; A63B 2220/833; A63B 2225/20; A63F 13/213; A63F 13/573; A63F 13/812; A63F 2300/1087; A63F 2300/646; A63F 2300/8011; A63F 13/215; G06T 7/246; G06T 2207/30241; G06T 7/292; G06T 2207/30204; G06T 2207/30224
See application file for complete search history.

(56) References Cited

U.S. PATENT DOCUMENTS

| | | | |
|---|---|---|---|
| 8,982,216 | B2 | 3/2015 | Ishii et al. |
| 9,684,009 | B2 | 6/2017 | Okur et al. |
| 2008/0139330 | A1 | 6/2008 | Tuxen |
| 2010/0151957 | A1* | 6/2010 | Hohla ................ A63B 24/0021 348/169 |
| 2015/0350609 | A1* | 12/2015 | Kim ...................... H04N 7/181 348/157 |
| 2016/0125234 | A1* | 5/2016 | Ota ........................ G06V 40/23 382/103 |
| 2018/0011184 | A1 | 1/2018 | Toit et al. |
| 2019/0391254 | A1* | 12/2019 | Asghar ................ G01S 13/723 |

OTHER PUBLICATIONS

Printout from https://www.foresightsports.com/gcquad-quadrascopic-launch-monitor, published prior to Jun. 2, 2020.
SkyTrak vs. Mevo + Buyer's Guide, published prior to Jun. 2, 2020.

* cited by examiner

HYBRID GOLF LAUNCH MONITOR

RELATED APPLICATIONS

This non-provisional patent application claims priority benefit, with regard to all common subject matter, of commonly assigned U.S. provisional patent application Ser. No. 62/865,551, filed Jun. 24, 2019, and entitled "HYBRID GOLF LAUNCH MONITOR." This application is hereby incorporated by reference in its entirety into the present application.

BACKGROUND

Numerous variables affect flight characteristics of a golf ball. A typical golf swing includes movements about many joints of the body simultaneously. As an example, these movements can include bending at the knees, twisting at the waist, bending at the waist, twisting at the shoulder, bending and twisting at the head, bending at the wrist and elbow of the leading arm, and bending at the wrist and elbow of the trailing arm. Each of these movements affects an angle and a direction at which the golf club strikes the golf ball. The angle and direction of the club strike directly affects flight characteristics of the golf ball. Due to the numerous variables and the speed of the swing, detecting specific swing error or errors is difficult.

SUMMARY

Embodiments of the present technology provide a hybrid golf launch monitor that utilizes one or more low-speed cameras and any of various trigger devices, such as a radar system, a microphone, a swing sensor, and/or some other sensor. The one or more low-speed cameras are configured to take successive images of the ball at an interval lower than their respective frame rates. The hybrid golf launch monitor utilizes the trigger device to time the successive images by the one or more low-speed cameras. In some embodiments, the hybrid golf launch monitor, through an analysis of one or more images, may be capable of ascertaining club path, ball launch angles, ball spin, impact location, and other flight characteristics. These flight characteristics may allow the user to improve future swings.

An embodiment of the golf launch monitor includes two low-speed cameras, a trigger device, and a processor. A first low-speed camera has a first frame rate and is configured to capture a first ball image. A second low-speed camera has a second frame rate and is configured to capture a second ball image. The trigger device is configured to detect a golf swing. The processor is configured to instruct, upon the trigger device detecting said golf swing, the first camera to capture the first ball image; instruct the second camera to capture the second ball image after a time interval, wherein the time interval is less than the first frame rate and the second frame rate; and determine, based at least in part on the first ball image and the second ball image, the flight characteristic of the golf ball.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein.

Figure 1:
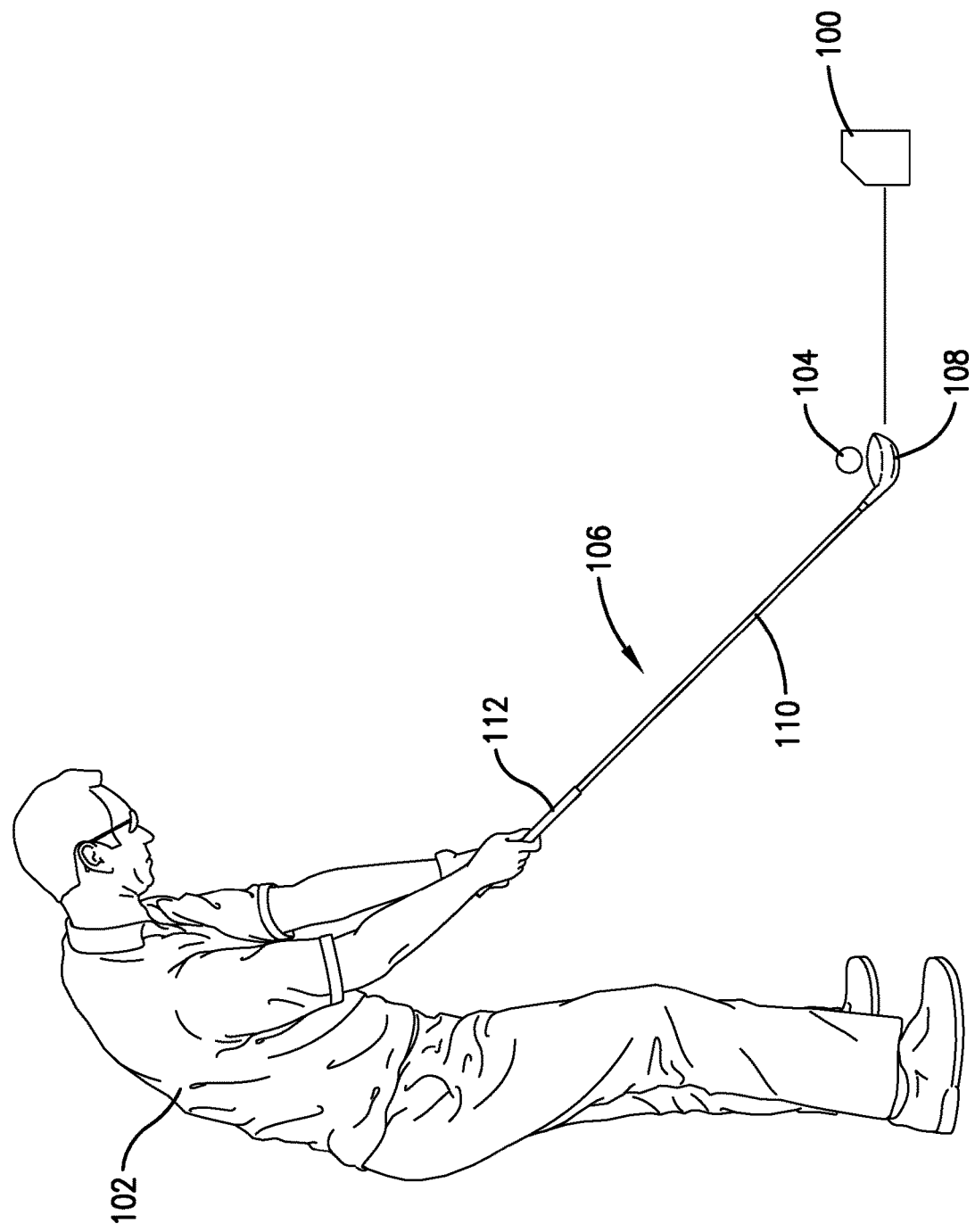
FIG. 1 is an environmental view of a golfer utilizing an embodiment of a hybrid golf launch monitor.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Exemplary Environment

Embodiments of the technology will now be described in more detail with reference to the drawing figures. Referring initially to FIG. 1, a hybrid golf launch monitor 100 is utilized by a golfer 102 (or other person) to analyze flight characteristics of a golf ball 104 that was struck by a golf club 106. The golf club 106 includes a club head 108 disposed at a distal end of a club shaft 110 and a club grip 112 disposed at a proximal end of the club shaft 110.

The hybrid golf launch monitor 100 is used to sense at least one swing characteristic of the golfer 102 or the golf club 106 while the golfer 102 strikes the golf ball 104. This can be done by placing the hybrid golf launch monitor 100 on the ground near the golf ball 104 as shown in FIG. 1. Additionally or alternatively, the monitor 100 may be placed on a stand or mount, held by the golfer 102 or another person, integrated into the ground or hitting mat, combinations thereof, and the like. The golfer 102 may orient an indicium (shown in FIGS. 6A, 6B, and 7 and discussed below) on the golf ball 104 toward the hybrid golf launch monitor 100, such that the hybrid golf launch monitor 100 may detect spin on the golf ball 104 by monitoring rotation of the indicium. The golfer 102 then swings the golf club 106, enabling one or more trigger devices of the hybrid golf launch monitor 100 to detect the swing. The hybrid golf launch monitor 100 calculates various flight characteristics of the golf ball 104 and/or the golf club 106 after the swing, as discussed in depth below. The calculated flight characteristics may then be utilized for any of various purposes. As one example, in an indoor simulated game, the calculated flight characteristics may be utilized to calculate a theoretical resting place for the golf ball 104 within the simulated game. As another example, the calculated flight characteristics may be utilized to diagnose and correct swings by the golfer 102 so as to improve subsequent swings.

Figure 2:
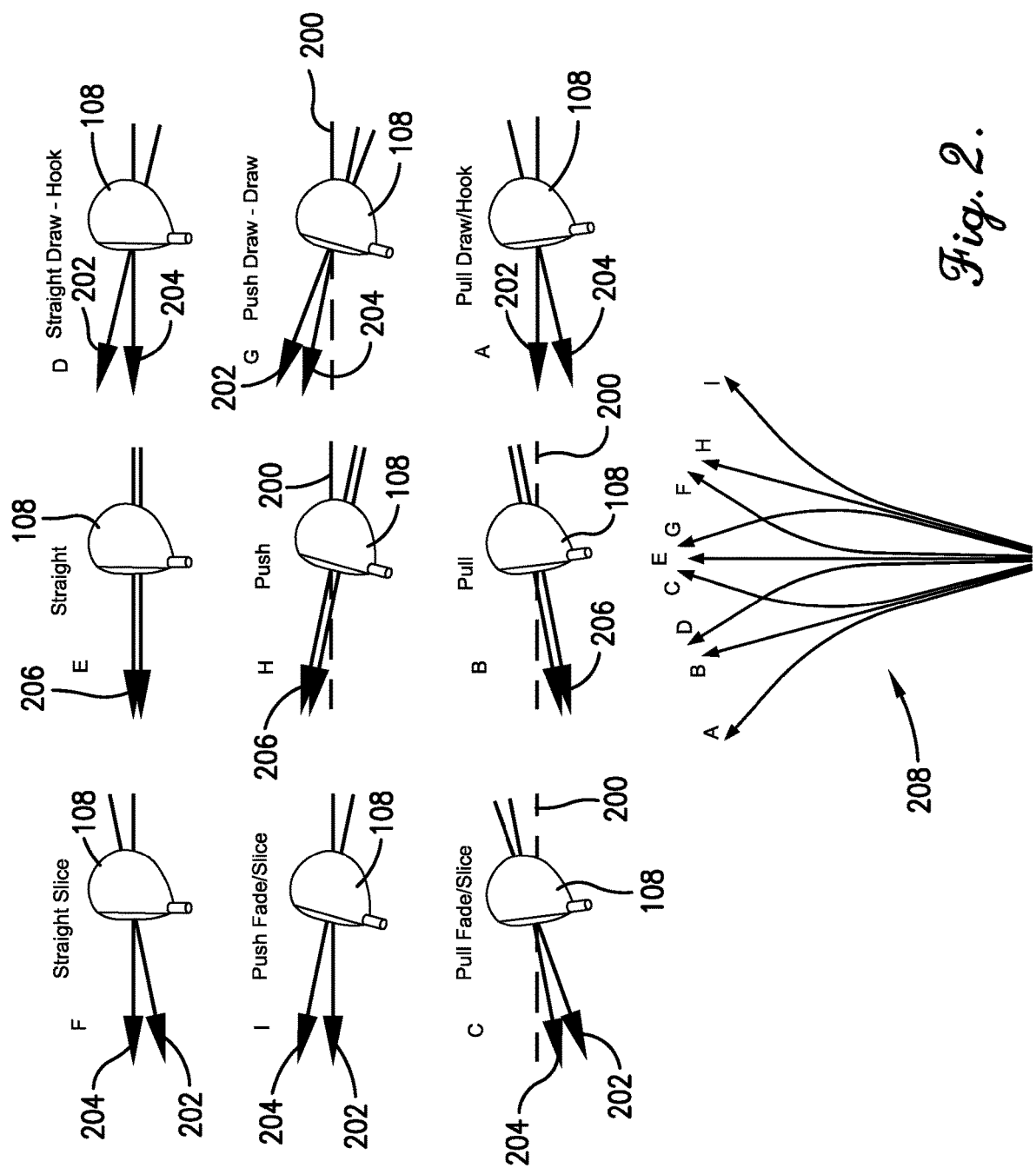
FIG. 2 is a schematic diagram showing effects of various golf swings on resultant flight characteristics.

Turning to FIG. 2, a diagram showing effects of various golf swings on resultant flight characteristics is shown. A straight-line reference 200 is shown. The golf ball 104 should start and remain generally aligned with the straight-line reference 200 during flight. The club head 108 presents a club face which directly strikes the golf ball 104 (not shown in FIG. 2). The club face strikes the golf ball 104 at a facial direction of travel 202 and a facial orientation 204 (which may include an aligned direction and orientation 206). The facial orientation 204 can be generally straight (as shown in diagrams F, E, and D), push (e.g., to the right, as shown in diagrams I, H, and G), or pull (e.g., to the left, as shown in diagrams C, B, and A). The facial direction of travel can be aligned with the facial orientation 204 (e.g., the aligned direction and orientation 206, as shown in diagrams E, H, and B), slicing (e.g., angled to the right, as shown in diagrams F, I, and C), or hooking (e.g., angled to the left, as shown in diagrams D, G, and A). A combination of the facial direction of travel 202 and the facial orientation 204 impacts a resultant trajectory 208. It should be noted that the respective combinations of facial orientation 204 and facial direction of travel 202 may be inferred from the resultant flight characteristics. For example, if the flight characteristic resembles the F resultant trajectory 208, the hybrid golf launch monitor 100 may infer that the golfer 102 performed a straight, slicing swing as shown in diagram F. The hybrid golf launch monitor 100 may therefore present information to the golfer 102 that the swing was straight and slicing and may additionally provide information to the golfer 102 to suggest steps the golfer 102 can take to reduce or eliminate the slicing.

Golf launch monitors may be used to measure and predict the path of a golf ball based on various characteristics of the ball (and/or club head) measured concurrently with striking of the golf ball. Launch monitors can be utilized indoors (for play simulation or training) or outdoors (for training and game review). High-speed camera systems can directly observe spin axis within moments of impact allowing accurate performance while indoors and outdoors. However, high-speed camera systems require high-speed image sensors and high processing power and are thus expensive. Further, high-speed camera systems have a limited field of view that does not allow for observation of entire swing path and flight path. Radar systems can utilize less-expensive hardware and simpler processing and provide an enormous field of view that allows for tracking of entire swings and long observation of environmental impacts on ball flight. But, radar systems are limited in that they can only observe the result of spin axis by observing a long period of ball flight. Thus, radar systems are only practical outdoors. Further, without direct observation of the spin axis, radar systems lack the accuracy of high-speed camera systems and are more susceptible to errors from weather and other external factors.

It should be appreciated that the present disclosure discusses embodiments of the invention directed to golf. However, this discussed field of use is only exemplary. The devices and methods discussed herein may be utilized in any of numerous sporting disciplines while being within the scope of the invention. Examples of other sporting disciplines which may utilize embodiments of the invention include baseball, softball, soccer, football, and cricket. It should therefore be noted that throughout the description, "golf ball" could be replaced by "baseball," "softball," "soccer ball," or "cricket ball."

Exemplary Hardware

Figure 3A:
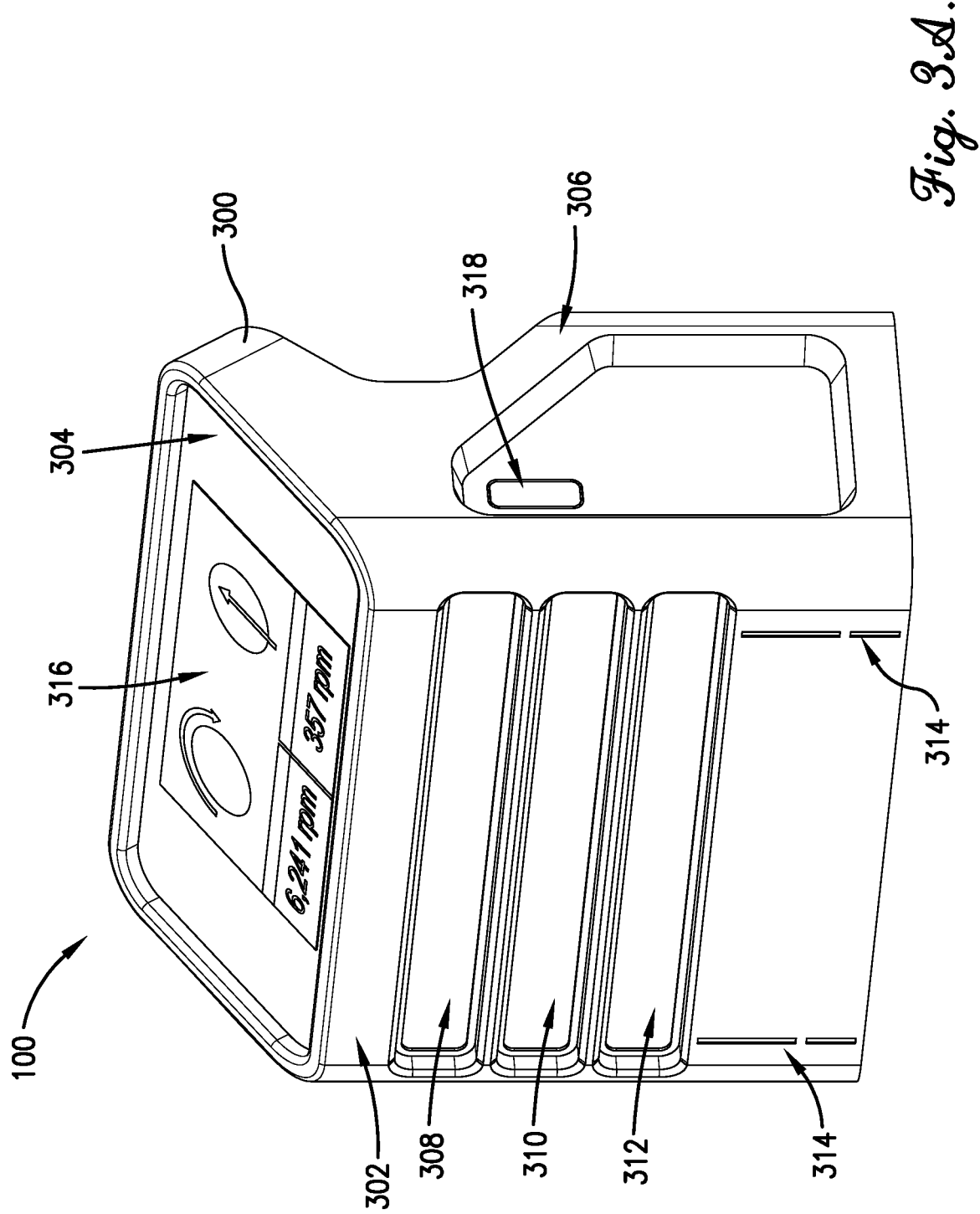
FIG. 3A is a perspective view of the hybrid golf launch monitor.
Figure 3B:
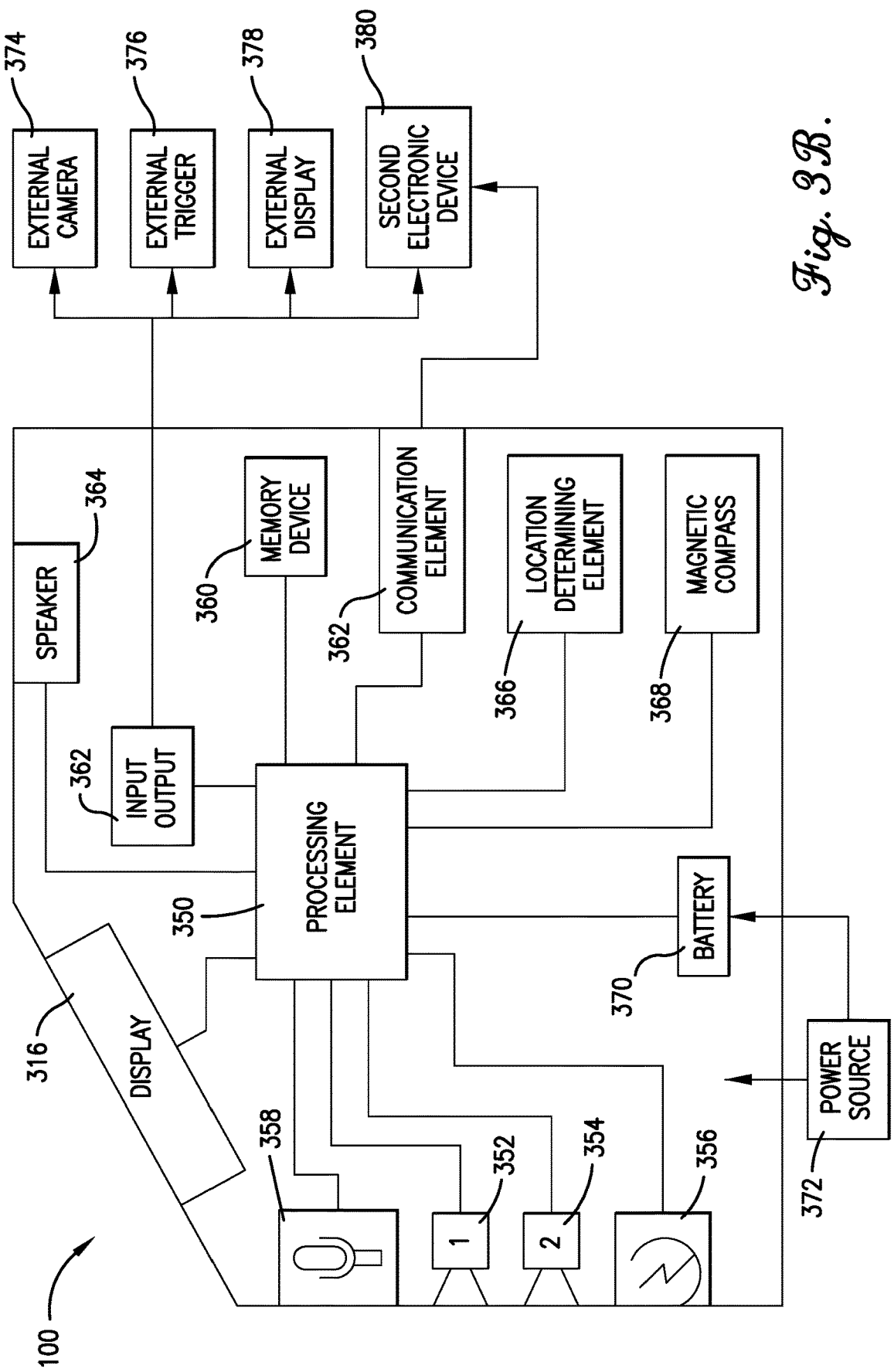
FIG. 3B is a schematic view showing various hardware components of the hybrid golf launch monitor.

Turning to FIGS. 3A and 3B, exemplary hardware of the hybrid golf launch monitor 100 is shown. FIG. 3A shows a perspective view of the external components of an exemplary embodiment of the hybrid golf launch monitor 100. FIG. 3B shows a schematic view of internal components of an exemplary embodiment of the hybrid golf launch monitor 100. In embodiments, the hybrid golf launch monitor 100 presents a generally size and shape configured to be carried to a golf course, driving range, indoor range, or other location. The hybrid golf launch monitor 100 is further configured to be placed on the ground and oriented toward the golfer 102, as shown in FIG. 1.

FIG. 3A shows a perspective view of an exemplary embodiment of the hybrid golf launch monitor 100. In some embodiments, the hybrid golf launch monitor 100 of embodiments comprises a housing 300 with a vertical front wall 302 and an angled top wall 304. The housing 300 may further include additional sidewalls 306. The housing 300 generally encloses and protects the components of the hybrid golf launch monitor 100 from moisture, vibration, and impact. In one embodiment, the housing 300 is a rugged housing. The housing 300 may be constructed from a suitable lightweight and impact-resistant material such as, for example, plastic, nylon, aluminum, or any combination thereof. The housing 300 may include one or more appropriate gaskets or seals to make it substantially waterproof or resistant. The housing 300 may take any suitable shape or size, and the particular size, weight, and configuration of the housing 300 may be changed without departing from the scope of the present technology.

The vertical front wall 302 is oriented toward the golfer 102 while the hybrid golf launch monitor 100 is in use, as shown in FIG. 1. The vertical front wall 302 may include a first opening 308, a second opening 310, and a third opening 312 configured to have various trigger devices and one or more cameras (shown in FIG. 3B and discussed below) associated therewith for observation of the swing. The vertical front wall 302 may also present one or more alignment marks 314 such that the golfer 102 may properly align the hybrid golf launch monitor 100 to the golf ball 104 (align the golf ball 104 to the hybrid golf launch monitor 100). As shown in FIG. 3A, the vertical front wall 302 may include two alignment marks 314, one on a left side of the hybrid golf launch monitor 100 and one on a right side of the hybrid golf launch monitor 100. The alignment marks 314 may be denoting a starting golf ball position for right-handed or left-handed golfer. The golfer 102 will generally align the golf ball 104 with a rearward alignment mark and hit the golf ball 104 toward a forward alignment mark. Which of the two alignment marks 314 is forward and which is rearward depends upon a handedness (and thus an orientation) of the golfer 102.

In some embodiments, the hybrid golf launch monitor 100 includes a display 316 disposed in the angled top wall 304 or elsewhere on the housing. The display 316 presents a user interface (discussed below) that provides resultant feedback to the golfer 102. The display 316 may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), electronic paper display (E Ink), or the like, or combinations thereof. The display 316 may possess a circular or a square shape or the display 316 may include a rectangular aspect ratio (as illustrated in FIG. 3A) that may be viewed in either a landscape or a portrait mode. In various embodiments, the display 316 may also include a touch screen occupying the entire screen or a portion thereof so that the display 316 functions as a user interface. The touch screen may allow the golfer 102 to interact with the hybrid golf launch monitor 100 by physically touching, swiping, or gesturing on areas of the screen. The touch screen may be referred to as an input device of the hybrid golf launch monitor 100. The housing 300 may also present a power button 318 and/or other physical inputs (not illustrated) on the sidewall 306 or other location.

Turning to FIG. 3B, various components of the hybrid golf launch monitor 100 will now be discussed. The various components described herein are shown connected in FIG. 3B but need not be physically connected to one another since wireless communication among the various depicted components is permissible and intended to fall within the scope of the present invention. In embodiments, the hybrid golf launch monitor 100 includes a processing element 350, a first camera 352, a second camera 354, a radar 356, a microphone 358, a memory device 360, a communications element 362, an input/output interface 364, a location-determining element 366, a magnetic compass 368, a battery 370, and a speaker 372. Other embodiments may include various combinations of these components, as well as additional components.

The processing element 350 may include one or more processors, microprocessors, microcontrollers, digital signal processors (DSPs), field-programmable gate arrays (FPGAs), analog and/or digital application-specific integrated circuits (ASICs), or the like, or combinations thereof. The processing element 350 may generally execute, process, or run instructions, code, code segments, software, firmware, programs, applications, apps, processes, services, daemons, or the like, or may step through states of a finite-state machine, or combinations of these actions. Machine learning techniques may also be implemented by the processing element 350. The processing element 350 may be in communication with the other electronic components through serial or parallel links that include address busses, data busses, control lines, and the like.

The processing element 350 may be configured to retrieve, process and/or analyze data stored in memory device 360, to store data in the memory device 360, to replace data stored in the memory device 360, to analyze data or signals, capture video and/or image data, generate data, receive commands, control various functions of the systems, etc. In some configurations, the processing element 350 may consist of a single microprocessor or microcontroller. However, in other configurations, the processing element 350 may comprise a plurality of processing devices (e.g., microprocessors, DSPs, etc.), such that each processor is configured to control and perform different operational functions. For example, the first processor may be utilized to perform operational functions, such as analyzing the data received from the camera, and the second processor may control the presentation of information provided to the golfer 102 on the display 316.

The first camera 352 and the second camera 354 are low-speed cameras. As used herein, a "low-speed camera" is one in which the frame rate is too low to practically use the camera for capturing both the first image and the second image. Frame rate is measured in frames per second. A low-speed camera is differentiated from a high-speed camera, which is capable of capturing both the first image and the second image in a single image sensor. In existing camera-based systems, a high-speed camera is utilized to take rapid images of a golf ball, so as to resolve the spin of the golf ball (which can be greater than ten thousand rotations per minute) and other flight characteristics without ambiguity. Further, speed of the golf ball can exceed one hundred and fifty miles per hour. As such, the existing camera-based systems need to operate at a frame rate of at least one thousand frames per second. High-speed cameras capable of frame rates exceeding one thousand frames per second make existing golf launch monitors too expensive for the average golfer. By utilizing two or more low-speed cameras timed to take pictures at a rapid interval, the two or more low-speed cameras can provide the benefits of a high-speed camera for a substantially reduced cost. Examples of low-speed cameras include cameras capable of fewer than one thousand frames per second, fewer than five hundred frames per second, fewer than two hundred frames per second, fewer than one-hundred fifty frames per second, fewer than seventy frames per second, fewer than sixty frames per second, in a range of thirty to one hundred frames per second, in a range of thirty to two hundred frames per second, in a range of forty to sixty frames per second, or in some other range.

The first camera 352 and the second camera 354 are disposed in one or more openings 308, 310, 312 in the housing. The first camera 352 may be laterally spaced from the second camera such that the field of view of the first camera 352 is slightly different from the field of view of the second camera 354. In some embodiments, the first camera 352 is laterally spaced from the second camera 354 approximately one inch. In other embodiments, the first camera 352 is laterally spaced from the second camera 354 in a range of up to eight inches, up to six inches, in a range of one to eight inches, or some other range. In some embodiments, the first camera 352 and the second camera 354 are symmetrically disposed within the hybrid golf launch monitor 100. In these embodiments, the which camera is the first and which is the second depends upon the handedness of the golfer 102. The first camera 352 and the second camera 354 may thus be aligned with or otherwise associated with the alignment marks 314 on the housing 300 of the hybrid golf launch monitor 100.

Figure 6A:
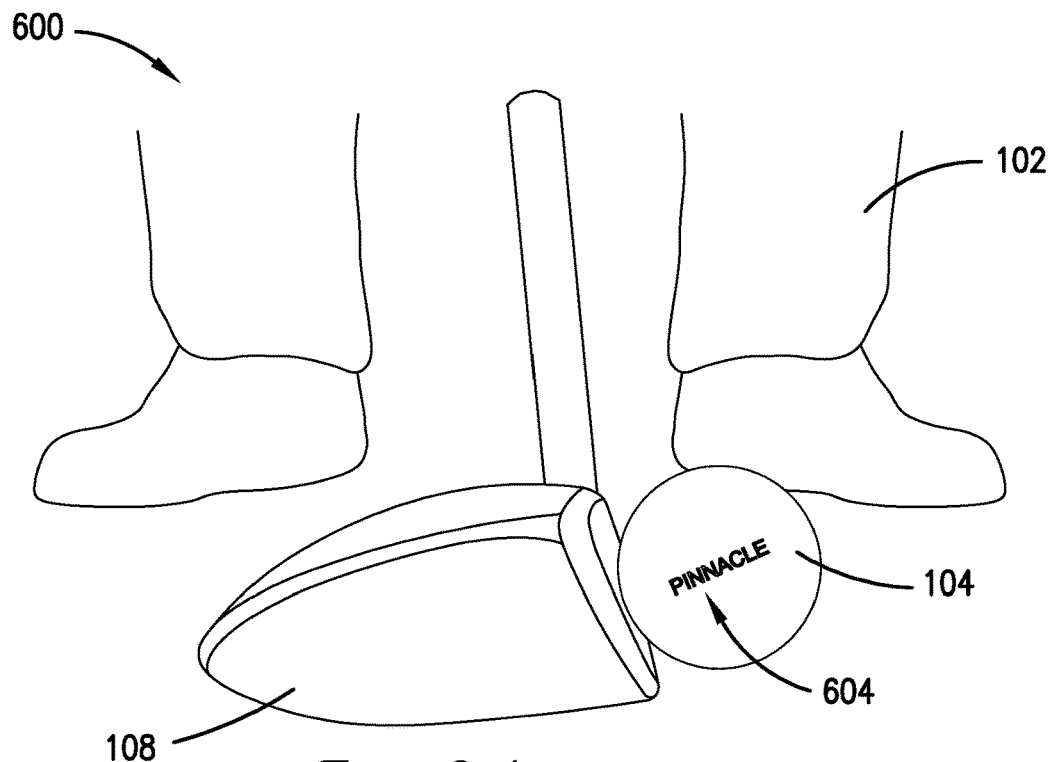
FIG. 6A is an exemplary first image taken by a first camera of the hybrid golf launch monitor.
Figure 6B:
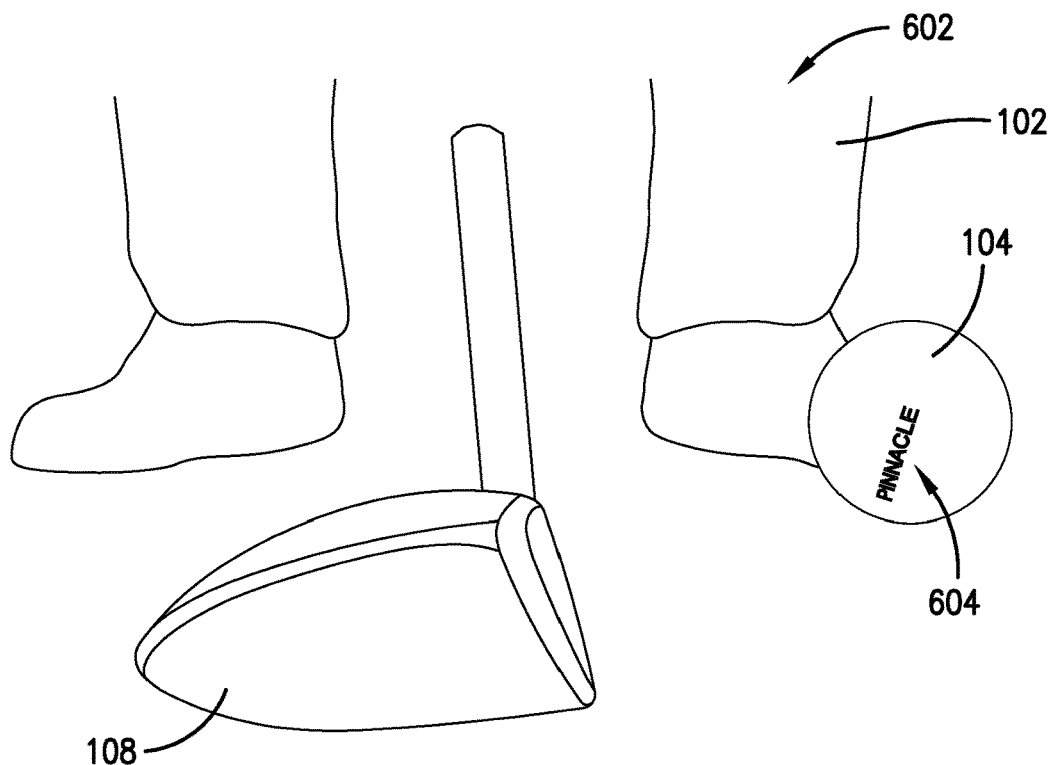
FIG. 6B is an exemplary second image taken by a second camera of the hybrid golf launch monitor.

The first camera 352 and the second camera 354 each generate images of a field of view (the "image data"). The cameras 352,354 are each configured to capture image data of the golf ball 104 at or after the club head 108 strikes the golf ball 104. Two exemplary captured images are shown in FIGS. 6A and 6B. The second camera 354 is configured to capture a second image after the first camera 352 captures a first image. A time interval between the first image and the second image may be static, variable, or input by the user (as discussed below). Typically, the time interval between the first image and the second image will be faster than a frame rate of the cameras 352,354. The allows the two low-speed cameras 352,354 to mimic a high-speed camera, but at a significantly reduced cost.

The cameras 352,354 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality. In embodiments, the cameras 352,362 each capture in each frame the objects present in the field of view (such as the club head 108, the golf ball 104, and/or the golfer 102, as shown in FIGS. 6A and 6B). The camera 312 may store the image data to any suitable portion of memory device 360, which may be stored in a "rolling buffer" format such that stored data is overwritten periodically, such as every certain number of frames or every hour, unless a user provides an input to the user interface indicating that the image data is no longer desired to be collected and stored in memory device 360.

In some embodiments, more or fewer than the two cameras 352,354 may be utilized. In some embodiments, a single camera may be utilized. In this embodiment, the first camera 352 takes a pre-strike image before or during the swing and a second, precisely timed second image (a "post-strike image"). The two images (the pre-strike image and the post-strike image) are then analyzed using similar techniques to those described below to determine one or more flight characteristics. In some embodiments, the hybrid golf launch monitor 100 includes a first camera 352, a second camera 354, and a third camera (not illustrated). The third camera is configured to capture a third image at a time interval after the second image. The third image is then compared to the first image and the second image to determine the one or more flight characteristics. The time interval between the second image and the third image may be the same time interval as between the first image and the second image or may be a different time interval. In some embodiments, the hybrid golf launch monitor 100 may further include a fourth camera, a fifth camera, etc. In some embodiments, the first camera 352 and the second camera 354 may be supplemented by one or more external cameras (via the input/output interface 364, discussed below). The one or more external cameras may capture a third image, a fourth image, etc. The external cameras may be positioned around the golfer 102 so as to capture additional views of the golf ball 104 and/or the club head 108. For example, the external camera may be disposed generally forward of the golf ball 104 and oriented so as to capture the club head 108 striking the golf ball 104, so as to help diagnose the strike of the golf ball 104. This image may also be presented to the golfer 102 on the display 316 to give the golfer 102 additional information on how the golf ball 104 was struck by the club head 108.

In embodiments, the processing element 350 may be configured to perform image data analysis techniques (using a suitable processing algorithm) on image data that may be stored in the memory device 360. The suitable algorithms may include one or more of a linear classifier algorithm, a support vector machine algorithm, a quadratic classifier algorithm, a kernel estimation algorithm, a boosting meta-algorithm, a decision tree algorithm, a neural network algorithm, a learning vector quantization algorithm, or other suitable algorithm. The image data analysis is utilized to determine one or more flight characteristics, as discussed below.

Various trigger devices will now be discussed. As opposed to traditional camera-based systems, which may capture numerous frames to be later analyzed to find the most relevant frames, accurate triggering is utilized because of the limit to two or three frames. The hybrid golf launch monitor 100 may thus utilize one or more triggering devices to accurately time the capture of the first image and the second image. The trigger device provides an estimation or determination of the time of the strike.

In some embodiments, the trigger device is the radar 356. The radar 356 is configured to provide one or more indications of a swing of the golf club 106. The radar 356 may use the Doppler effect to measure the speed and/or position of the club head 108 and/or the golf ball 104. In embodiments, the radar 356 is configured to capture a single-channel doppler radar 356 observation. The radar 356 may include a radiation source and a radiation sensor (not illustrated). The radiation source may be positioned in or otherwise associated with one of the openings 308, 310, 312 in the housing 300 so the electronic hybrid golf launch monitor 100 may be placed on the ground in proximity of the golfer 102 and the golf ball 104.

In some embodiments, the microphone 358 is used as a trigger device. The microphone 358 provides an indication of noise level detected. A sharp rise in the noise level is indicative that the golf club 106 has just struck the golf ball 104. Thus, the processing element 350 may immediately trigger the first camera 352 and trigger the second camera 354 after the time interval. The microphone 358 may provide a low-cost option for the trigger device, which requires less processing power than the radar 356. In some embodiments, the microphone 358 is directional so as to detect sound primarily from the direction of the golf ball 104, this may reduce false positives of other nearby golf strikes (for example, if the hybrid golf launch monitor 100 is used at a driving range).

In some embodiments, the radar 356 and the microphone 358 are used together as a trigger device. The radar 356 may be utilized to provide swing analytics and an indication of when the swing has begun. Additionally or alternatively, the radar 356 may provide an indication of impact time or other swing events to assist the microphone 358 in capturing impact of the golf ball or otherwise functioning as a trigger for the one or more cameras 352, 354. The microphone 358 may be utilized for precise timing of the first camera 352 and the second camera 354. Other trigger devices may include an external trigger 376, as discussed below.

The memory device 360 may include data storage components such as read-only memory (ROM), programmable ROM, erasable programmable ROM, random-access memory (RAM) such as static RAM (SRAM) or dynamic RAM (DRAM), hard disks, floppy disks, optical disks, flash memory, thumb drives, universal serial bus (USB) drives, or the like, or combinations thereof. The memory device 360 may include, or may constitute, a "non-transitory computerreadable storage medium." The memory device 360 may store the instructions, code, code segments, software, firmware, programs, applications, apps, services, daemons, or the like that are executed by the processing element 350. The memory device 360 may also store settings, data, documents, sound files, photographs, movies, images, databases, and the like.

Over time, the processing element 350 may store in memory device 360 statistical data to help the golfer 102 improve his swing performance. The statistical data may include, for example, the flight characteristics of numerous swings. The statistical data may be analyzed to determine trends. These trends may be indicative of errors in technique by the golfer 102.

The processing element 350 may also store in the memory device 360 the first image and the second image. In other embodiments, the first camera 352 may store the first image in the memory device 360, and the second camera 354 may store the second image in the memory device 360. The processing element 350 may then retrieve the first image and the second image to perform the below-discussed analysis.

The communications element 362 generally enables communication between the hybrid golf launch monitor 100 and external systems or devices. The communications element 362 may include signal or data transmitting and receiving circuits, such as amplifiers, filters, mixers, oscillators, digital signal processors (DSPs), and the like. Various combinations of these circuits may form a transceiver, which transmits, receives, and processes signals such as the ones listed in the following discussion. The communications element 362 may establish communication wirelessly by utilizing radio frequency (RF) signals and/or data that comply with communication standards such as cellular 2G, 3G, or 4G, Institute of Electrical and Electronics Engineers (IEEE) 802.11 standard such as Wi-Fi, IEEE 802.16 standard such as WiMAX, Bluetooth™, or combinations thereof. In addition, the communications element 362 may utilize communication standards such as ANT, ANT+, Bluetooth™ low energy (BLE), the industrial, scientific, and medical (ISM) band at 2.4 gigahertz (GHz), or the like. The communications element 362 may be in communication with the processing element 350 and the memory device 360. In various embodiments, the hybrid golf launch monitor 100 may be configured to establish communication with more than one protocol or standard, and the communications element 362 may include a transceiver for each protocol or standard, such as Bluetooth™, Wi-Fi, cellular, etc., with which the hybrid golf launch monitor 100 can communicate. The communications element 362 may be in electronic communication with an antenna that wirelessly transmits and receives electronic signals to and from other electronic devices, such as a smartphone, a tablet, a laptop, or a desktop computer, or communication network interfaces such as a Wi-Fi router or a cell tower.

The hybrid golf launch monitor 100 may include an input/output interface 364 that may enable interaction between hybrid golf launch monitor 100 and an external camera 374; an external trigger 376; an external display 378; and/or a processing element, memory device, and/or user interface associated with a secondary electronic device 380 (e.g., associated with a smartphone, tablet, or personal computer). Hybrid golf launch monitor 100 may supplement the functionality of the display 316 and user interface (discussed below) included in hybrid golf launch monitor 100 with an external display, external processing element, and/or external memory associated with the secondary electronic device. For example, hybrid golf launch monitor 100 may use input/output interface 364 to transmit image data (unprocessed, semi-processed or fully processed) to enable a secondary electronic device to provide user interface and/or visual or audible output functionality (using a display or speaker associated with the secondary device), processing functionality (using a processing element associated with the secondary device) or data storage functionality (using a memory element associated with the secondary device). In some embodiments, external components may be operable to perform any of the functionality associated with the various internal components described herein.

The input/output interface 364 generally allows the user to upload data to, download data from, or adjust the settings of the hybrid golf launch monitor 100. The input/output interface 364 may be wired or wireless and may include antennas, signal or data receiving circuits, and signal or data transmitting circuits. The input/output interface 364 may transmit and receive radio frequency (RF) signals and/or data and may operate utilizing communication standards such as ANT, ANT+, Bluetooth™ low energy (BLE), Near Field Communications (NFC), or the like. In various embodiments, the input/output interface 364 may transmit and receive data using the industrial, scientific, and medical (ISM) band at 2.4 gigahertz (GHz). Furthermore, in some embodiments, the input/output interface 364 may communicate with a wireless dongle that connects to the USB port of a desktop, laptop, notebook, or tablet computer, or other electronic device. An exemplary input/output interface 364 includes an nRF51922 RF integrated circuit (IC) from Nordic Semiconductor of Trondheim, Norway.

In some embodiments, the input/output interface 364 interfaces with an external camera 374. The external camera may be communicatively coupled with the processing element 350 or with a second electronic device. The external camera may be a first camera, a second camera, a third camera, a fourth camera, etc. In some embodiments, the external camera may be placed forward of the golfer 102 and oriented toward the golf ball 104, such that the external camera can view where on the club face makes contact with the golf ball 104.

In some embodiments, the input/output interface 364 interfaces with an external trigger 376. In some embodiments, the external trigger 376 may be configured to be worn or carried by the golfer 102 to sense a swing characteristic based on the movements of the golfer 102. For example, the sensor may be an inertial type sensor including one or more accelerometers and a processing system. The accelerometers measure accelerations of the arm of the golfer 102 (e.g., at a smartwatch) or other body part, and the processing element 350 estimates a motion parameter utilizing the acceleration measurements. The motion parameter may be, for example, a duration of the backswing, downswing, or follow-through or a speed or tempo of the swing or portion of a swing.

In other embodiments, the external trigger may be both a motion-type sensor and an inertial-type sensor. In these embodiments, the external trigger is utilized to sense the same swing characteristics or may be used to sense different but related swing characteristics. The sensor or sensors described herein for sensing swing characteristics may be replaced with other known golf swing sensors. The external trigger may sense at least one swing characteristic of the golfer 102 or the golf club 106 as the golfer 102 strikes the golf ball 104. For example, the external trigger may sense a club head loft angle, a club head face angle, a club head velocity, a club swing path, a club swing plane, the stance, the head position, swing timing, the backswing, the impact position, the follow-through, the shoulder rotation, the wrist angle, or any other aspect of a golf swing. These measurements may, directly or indirectly, be indicative of a time in which the golf club 106 will strike the golf ball 104. The processing element 350 may use the determination of the time of the strike to time the first camera 352 and the second camera 354.

In some embodiments, the input/output interface 364 interfaces with an external display 378. The external display may allow for the display of output information on another screen. In some embodiments, the hybrid golf launch monitor 100 may not include the display, as such all display of information will be made through the external display. In other embodiments, the external display may supplement information on the display 316. For example, a simplified user interface may be shown on a smartwatch worn by the golfer 102 to include the below-discussed resultant feedback.

In some embodiments, the input/output interface 364 and/or the communications element 362 interfaces with a second electronic device 380. The second electronic device may provide information to assist in the various calculations. As a first example, the second electronic device may provide weather information. This may help in diagnosing flight characteristics, such as if the golfer 102 is hitting into a cross wind, this may explain certain flight characteristics. Lacking weather information, the flight characteristics would be incorrectly diagnosed. As a second example, the second electronic device may provide information related to the golf course, driving range or other location of the hybrid golf launch monitor 100.

Generally, the location-determining element 366 determines a current geolocation of the hybrid golf launch monitor 100 and may process a first electronic signal, such as radio frequency (RF) electronic signals, from a global navigation satellite system (GNSS) such as the Global Positioning System (GPS) primarily used in the United States, the GLONASS system primarily used in the former Soviet Union, the Galileo system primarily used in Europe, or the BeiDou system primarily used in China. The location-determining element 366 may include satellite navigation receivers, processors, controllers, other computing devices, or combinations thereof, and memory. The location-determining element 366 may be in electronic communication with an antenna that wirelessly receives electronic signals from one or more of the previously mentioned satellite systems and provide the electronic signal to the location-determining element 366. The location-determining element 366 may process each electronic signal, which includes data and information, from which geographic information such as the current geolocation is determined. The current geolocation may include geographic coordinates, such as the latitude and longitude, of the current geographic location of the hybrid golf launch monitor 100. The location-determining element 366 may communicate the current geolocation to the memory device 360 and/or the processing element 350. Thus, the location-determining element 366 is configured to receive and/or generate a location signal and determine a current geolocation of the hybrid golf launch monitor 100 using the location signal.

The processing element 350 may search through a database of cartographic information to find known golf courses or golf course holes which match a series of geographical coordinates. A user may initiate a search, or the search engine may automatically search the database based on a state of the hybrid golf launch monitor 100 such as the current position of the device. The search engine, or alternatively a separate computation engine, may also perform calculations related to the cartographic information. The map mapping search engine may also identify a map location, such as a golf course, golf course hole, golf course fairway, or golf course green associated with one or more geographical coordinates.

The magnetic compass 368 provides an indication of magnetic north, or some other true direction indication. The indication of magnetic north may be utilized to determine a true azimuth of the ball flight. The hybrid golf launch monitor 100 will determine a relative azimuth of the ball flight (e.g., relative to the hybrid golf launch monitor 100). The processing element 350 may determine a true azimuth by combining the relative azimuth with a magnetic heading of the hybrid golf launch monitor 100 relative to magnetic north. The processing element 350 and/or the magnetic compass 368 may perform a conversion between magnetic north to true north (or some other fixed orientation) based upon location information from the location-determining element 366.

The battery 370 provides electrical power to the other electronic components of the hybrid golf launch monitor 100. In embodiments, the hybrid golf launch monitor 100 is configured to be used on a driving range, or a golf course, or in any other remote location. As such, the battery 370 provides electrical power without requiring a wired power connection. In some embodiments, and in some instances, the battery 370 may be associated with a power source 382. The power source charges the battery 370 and/or provides dedicated power for monitor 100. The battery 370 and/or the power source 382 may comprise conventional power supply elements, such as batteries, battery packs, etc. The power source may also comprise power conduits, connectors, and receptacles operable to receive batteries, battery connectors, or power cables. For example, the power source may include both a battery 370 to enable portable operation and a power input for receiving power from an external source such a golf cart.

The hybrid golf launch monitor 100 may include a speaker 372 and/or an audio-output device (not illustrated). The speaker 372 may directly deliver the audible recommendations to the golfer 102 following the swing. The audio-output device may utilize an external speaker or headphone. For example, the audio-output device may receive a jack for a set of headphones worn by the golfer 102 during the swing. As another example, the audio-output device may be a Bluetooth device which sends the audible recommendations to an external Bluetooth-enabled speaker.

In one embodiment, the hybrid golf launch monitor 100 may be configured to utilize a single camera (first camera 352) and eliminate the need for second camera 354 or other cameras. Knowing the size of a golf ball and optical details of the camera 352, the processing element 350 can estimate the distance of the ball from camera 352 (and/or its image sensor) from a single image. Knowing the physical separation of the camera 352 from the microphone 358, the distance from the ball to the microphone 358 can then be calculated by processing element 350. The microphone-based camera trigger is latent according to the distance of the ball from the microphone 358 and the speed of sound in air. Knowing these two values, the processing element 350 can calculate image trigger latency for camera 352 (i.e., the time delay from club impact on the ball to the camera 352 capturing an image). Image trigger latency, ball distance, optical camera details, distances between system 100 components, and related system configuration information may be stored in memory device 360 and retrieved by processing element 350 or calculated dynamically in real-time.

The processing element 350 can calculate ball metrics from two images. In some embodiments, including those using two cameras 352, 354, these two images can be post-impact, once the ball is off the face of the club, such that the ball is no longer in compression due to the club impact. However, if image trigger latency is calculated as described above, then a post contact image can be compared with a pre-contact image, since the pre-contact image is constant regardless of the time at which it was taken (because the ball isn't yet moving). These two images are separated by a known time delta (e.g., the image trigger latency) according to the speed of sound in air, and can be used to calculate ball flight metrics by the processing element 350. For example, processing element 350 can calculate changes in ball distance and ball orientation over the known time delta to extrapolate ball flight information and related metrics. The speed of sound in air is specified by a known formula, and varies according to air temperature. The inclusion of a temperature sensor for ambient temperature detection can improve the accuracy of the speed of sound value.

Embodiments of monitor 100 may therefore employ a single camera 352, calculate image trigger latency, capture two images (pre-impact and post-impact) using single camera 352 without requiring high frame rates, and then calculate ball metrics as described above.

Exemplary Method Steps

Figure 4:
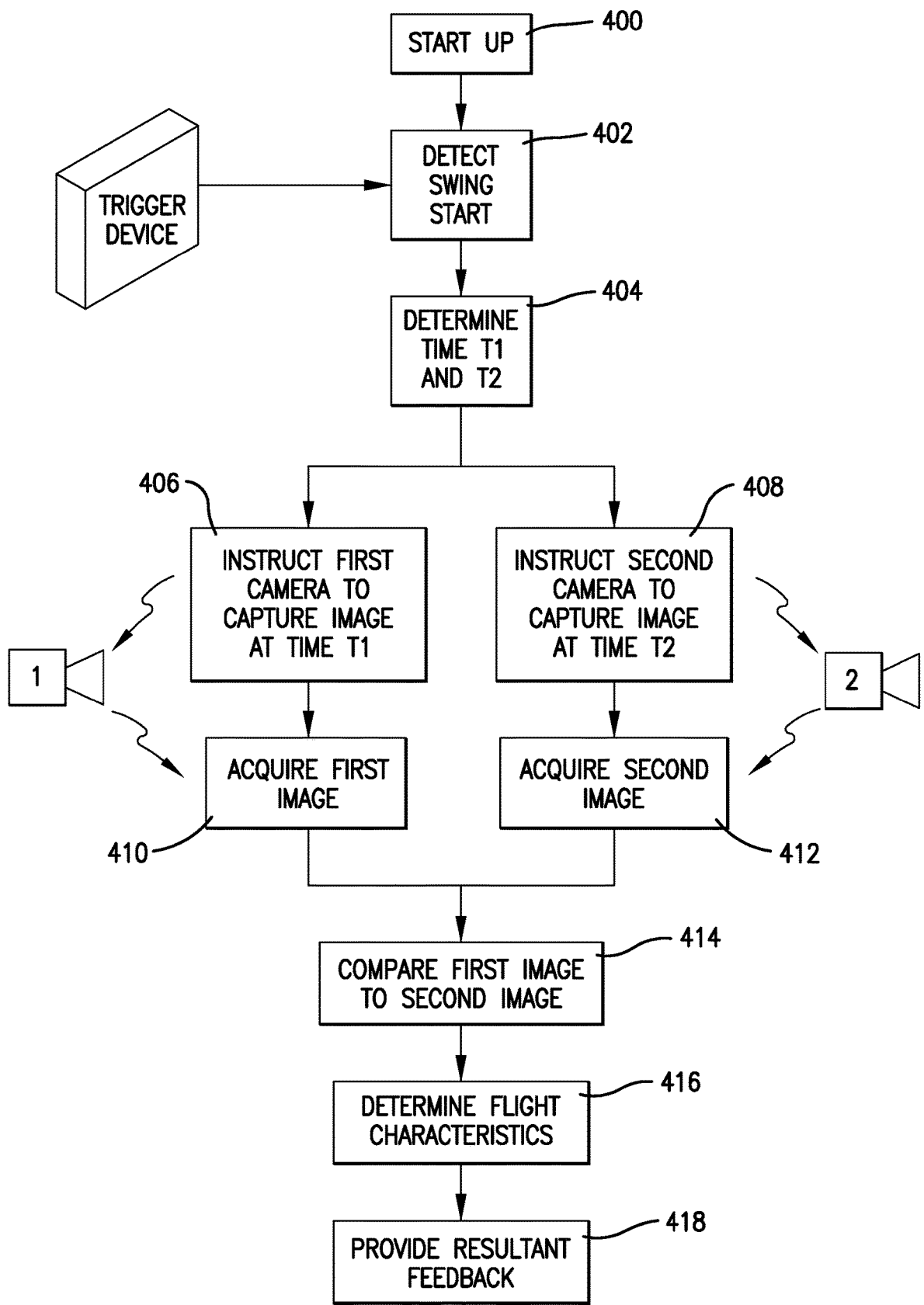
FIG. 4 is a flow chart showing steps performed by the hybrid golf launch monitor.

Turning now to FIG. 4, an exemplary method performed by the above-discussed hardware components or other embodiments of the hardware components will now be described. Generally, the processing element 350 may determine when the swing is beginning, determine an appropriate time to capture the images, acquire and compare the images, and then determine one or more flight characteristics based upon the comparison. Once the analysis is complete, the processing element 350 may control the display 316 and/or the speaker to output visual/audio feedback signals. In some embodiments, the processing element 350 may present on the display 316 or control speaker to output audio signals with a recommendation relating to an upcoming swing based on previously-identified aspects of the performance that may be improved or provide feedback on previously performed swings, as discussed below. In other embodiments, the processing element 350 may present on the display 316 various information about the flight characteristics. In still other embodiments, the processing element 350 may determine an estimated landing position (and/or resting position after roll) for the golf ball 104, for use in a simulated game for example.

In Step 400, the processing element 350 is activated. The processing element 350 may go through any of standard startup procedures for the hybrid golf launch monitor 100. The processing element 350 may present, on the display 316, in introductory graphical user interface. The graphical user interface may allow the user to input various information about the swing or swings to be performed. This information may include a golfer name (so as to access a user profile for that golfer 102), golfer information (handedness, age, height, skill level, normal swing speed, golf handicap, etc.), golf club information (type of club, weight, length, club face size, or make and model of the golf club 106—so as to access a club profile), swing information (driving swing, chipping swing, putting swing, etc.) location information (which may include or access weather information, relative terrain between the hybrid golf launch monitor 100 and the golf ball 104, tee/fairway/rough/green, etc.), usage scenario (indoor/outdoor, driving range, simulated game, actual game), and other information which may be pertinent to the analysis of the swing. In some other embodiments, the startup may present to the user an option to perform one or more calibration swings.

In Step 402, the processing element 350 detects a swing. The processing element 350 detects the swing based at least in part on a signal from one or more trigger devices, such as the radar 356, the microphone 358, and the external trigger (such as a swing analyzer on the golf club 106). The processing element 350 may interpret or otherwise analyze the signal from the one or more trigger devices to determine when the club head 108 will strike the golf ball 104 so as to time the one or more cameras 352,354.

Figure 5:
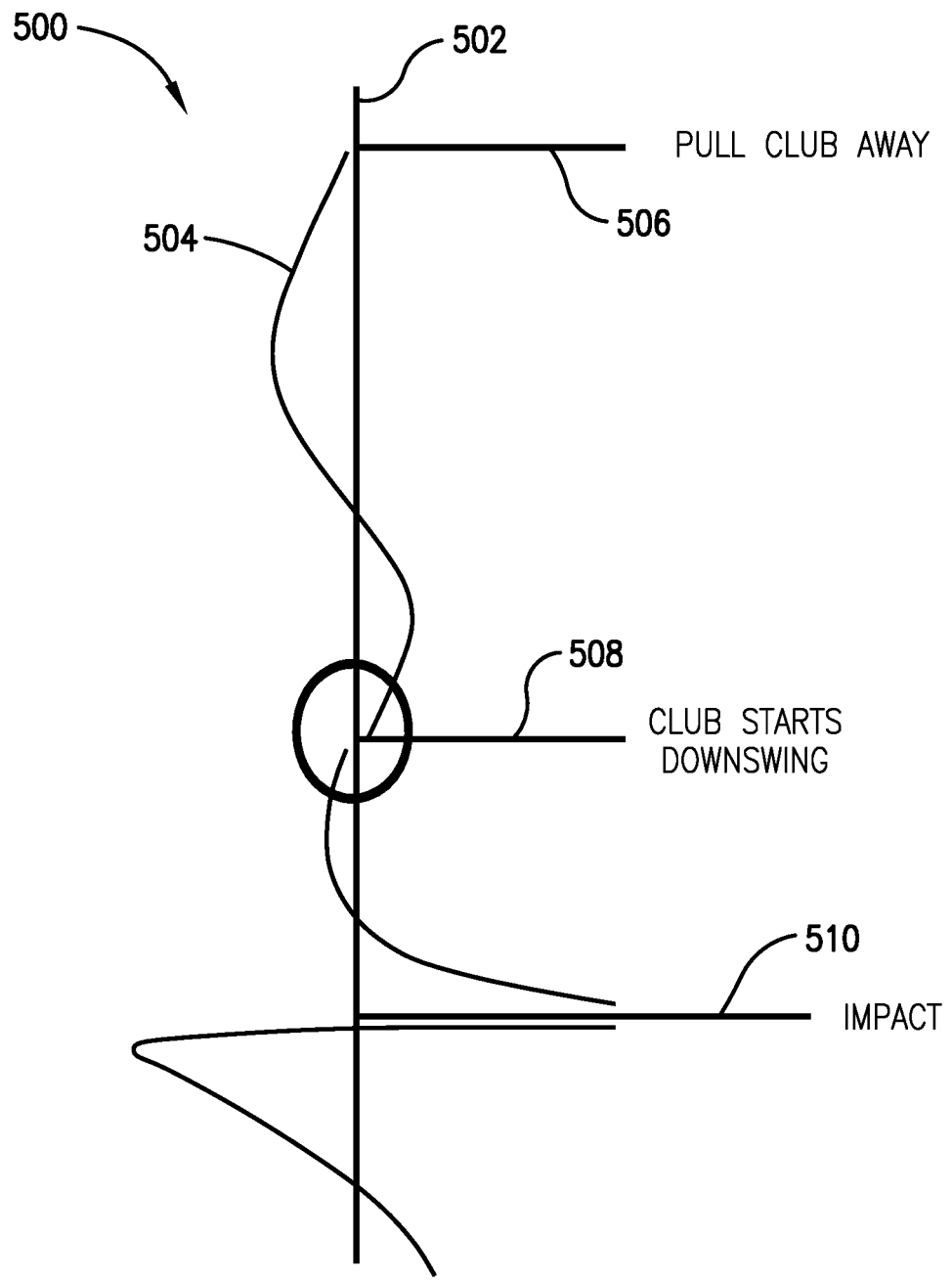
FIG. 5 is a radar signature diagram illustrating the identification of swing timing.

In embodiments in which the trigger device is the radar 356, the processing element 350 will analyze an output from the radar 356 to detect the swing and determine when the swing will strike the golf ball 104. An example of the output of the radar 356 is shown in FIG. 5 as a radar signature diagram. A radar graph 500 is shown with a baseline 502 thereon. A radar reading 504 is plotted on the radar graph 500 relative to the baseline 502. The radar reading 504 crossing the baseline 502 may be indicative of various events. As a first example, the radar reading 504 leaving the baseline 502 may be indicative of a pull away 506, in which the golfer 102 has pulled the golf club 106 away from the golf ball 104 (e.g., to begin the swing). As a second example, the radar reading 504 again crossing the baseline 502 may be indicative of a downswing start 508, in which the golfer 102 has reached the apex of the backswing and begun the downswing toward the golf ball 104. As a third example, a sharp crossing of the baseline 502 by the radar reading 504 may be indicative of the impact 510 of the golf club 106 at the golf ball 104. The processing element 350 may, by analyzing the prior radar readings 504, estimate the time of the impact 510 of the golf club 106, which may dictate when the first camera 352 and the second camera 354 take their respective images.

In embodiments in which the trigger device is the microphone 358, the processing element 350 may not detect the swing until the golf club 106 actually strikes the golf ball 104. In embodiments in which the trigger device is the external trigger, the processing element 350 may receive a signal indicative that the swing has begun, which may include other various metrics of the swing (such as swing position, swing speed, etc.). In embodiments in which more than one trigger device is utilized, a combination of the above techniques may be used.

In Step 404, the processing element 350 determines a time T1 and a time T2. The time T1 is the time at which the first camera 352 takes the first image. The time T2 is the time at which the second camera 354 takes the second image. Examples of a first image and a second image are shown in FIGS. 6A and 6B. The time T1 is separated from the time T2 by a time interval. The time T1 is determined based upon one or more trigger signals from one or more trigger devices being indicative of when the swing of the golf club 106 will strike the golf ball 104. The time T2 is determined based upon the time interval, as discussed below.

In some embodiments, the processing element 350 sends an instruction to the first camera 352 which includes the time T1 such that the first camera 352 will capture the first image when the time T1 arrives. In other embodiments, the processing element 350 may provide the instruction to the first camera 352 at the time T1, such that the first camera 352 captures the first image immediately upon receiving the instruction from the processing element 350. Similarly, the processing element 350 instruction to the second camera 354 which includes the time T2 such that the second camera 354 will capture the second image when the time T2 arrives. In other embodiments, the processing element 350 may provide the instruction to the second camera 354 at the time T2, such that the second camera 354 captures the second image immediately upon receiving the instruction from the processing element 350.

In some embodiments, the time T1 is calculated as a future time. In these embodiments, the radar or other external trigger provides an indication of a swing in progress. Based upon the speed and position of the club head 108, a time of the strike may be calculated. This calculation of the time of the strike may be performed by the processing element 350 and/or the trigger device. The time T1 may be calculated to be at or slightly after the time of the strike, based at least in part on the trigger signal from the trigger device.

In some embodiments, the time T1 is immediate. In these embodiments, the time T1 is determined to be as quickly as possible. For example, if the trigger device is the microphone 358, the trigger signal may be indicative of the sound of the golf club 106 striking the golf ball 104. As such, the processing element 350 may determine that the first camera 352 should capture the first image as soon as the trigger signal from the microphone 358 is received. As such, the processing element 350 determining the time T1 need not include a calculation but may instead be conditional (being as soon as the trigger signal is received).

In some embodiments, the time interval between the time T1 and the time T2 is fixed, set, or otherwise pre-determined. In these embodiments, the time interval is constant for each iteration. The time interval may be set for the hybrid golf launch monitor 100, such that it is used for all iterations. In these embodiments, the time T2 is determined by adding the time interval to the time T1.

In some embodiments, the time interval is dynamically variable. In these embodiments, the processing element 350 (and/or the trigger device) calculates a speed of the swing (directly or indirectly). The speed of the swing is indicative of the speed of the golf ball 104 after impact. As such, the speed of the swing may dictate or otherwise influence the time interval for that particular swing. The time interval may be set to maximize the amount of travel of the golf ball 104 in the first image and the second image, without causing the golf ball 104 to be outside the field of view during the second image. Further, over-rotation of the golf ball 104 may prevent the processing element 350 from determining spin and other flight characteristics. This is because the processing element 350 analyzes the movement of an indicium (shown in FIGS. 6A, 6B, and 7) on the golf ball 104.

In some embodiments, the time interval is statically variable. In these embodiments, the time interval is determined (directly or indirectly) by the user via a graphical user interface. The user may input various information into the graphical user interface that may be used by the processing element 350 to determine an appropriate time interval between the first image and the second image. For example, the golfer 102 (or other user) may input a skill level, a type of swing, an age, an average drive length, or other information. The processing element 350 may utilize this information in calculating an appropriate time interval for that user. In future iterations, the user may select their profile so as to instruct the processing element 350 to utilize the previously determined time interval.

In Step 406, the processing element 350 instructs the first camera 352 to capture a first image at the time T1. The time T1 may be immediately upon instruction of the processing element 350, upon a specific and precise time relayed in the instruction, or at some other time. In Step 408, the processing element 350 instructs the second camera 354 to capture a second image at the time T2. In some embodiments, the processing element 350 may provide a single instruction to both the first camera 352 and the second camera 354, which includes the time T1 and the time T2 being executed by the respective camera 352,354 at the respective time.

In Step 410, the processing element 350 acquires the first image from the first camera 352. The first camera 352 may send the first image directly to the processing element 350. In other embodiments, the first camera 352 stores the first image in the memory device 360, such that the processing element 350 may retrieve the first image during the below-discussed analysis. In Step 412, the processing element 350 acquires the second image from the second camera 354. The second camera 354 may send the second image directly to the processing element 350. In other embodiments, the second camera 354 stores the second image in the memory device 360, such that the processing element 350 may retrieve the second image during the below-discussed analysis. In embodiments, the first image is a single, still-frame image of the golf ball 104 in relation to the golf club 106; and the second image is a single, still-frame image of the golf ball 104 in relation to the golf club 106. The second image shows the golf ball 104 progressed through the flight relative to the first image.

Turning now to FIGS. 6A and 6B, an exemplary first image 600 and an exemplary second image 602 are shown, respectively. As can be seen, the golf ball 104 is in a different position in the exemplary first image 600 and the exemplary second image 602. An indicium 604 on the golf ball 104 is visible in both the exemplary first image 600 and the exemplary second image 602. The indicium 604 has rotated in the exemplary second image 602 relative to the exemplary first image 600. The rotation of the indicium 604 is indicative of an amount and a direction of spin imparted on the golf ball 104 by the swing. The indicium 604 may be any easily discernable mark on the golf ball 104.

In Step 414, the processing element 350 compares the first image to the second image. An amount of the progression of the golf ball 104 in the second image, relative to the first image, is indicative of a speed of the golf ball 104 as imparted by the swing. A relative size of the golf ball 104 in the second image relative to the first image is indicative of an azimuth direction of the strike. A relative vertical location of the golf ball 104 in the second image relative to the first image is indicative of an elevation direction of the strike. An amount of progression of the indicium 604 on the golf ball 104 between the first image and the second image is indicative of an amount of spin imparted on the golf ball 104 by the strike. A direction of the progression of the indicium 604 on the golf ball 104 is indicative of a spin direction imparted on the golf ball 104 by the strike. If the indicium 604 is not visible in the second image, this may be indicative that the strike imparted an excessive spin on the golf ball 104. In subsequent iterations, the processing element 350 may reduce the time interval to capture a second image showing the indicium 604 prior to over rotation of the golf ball 104.

Figure 7:
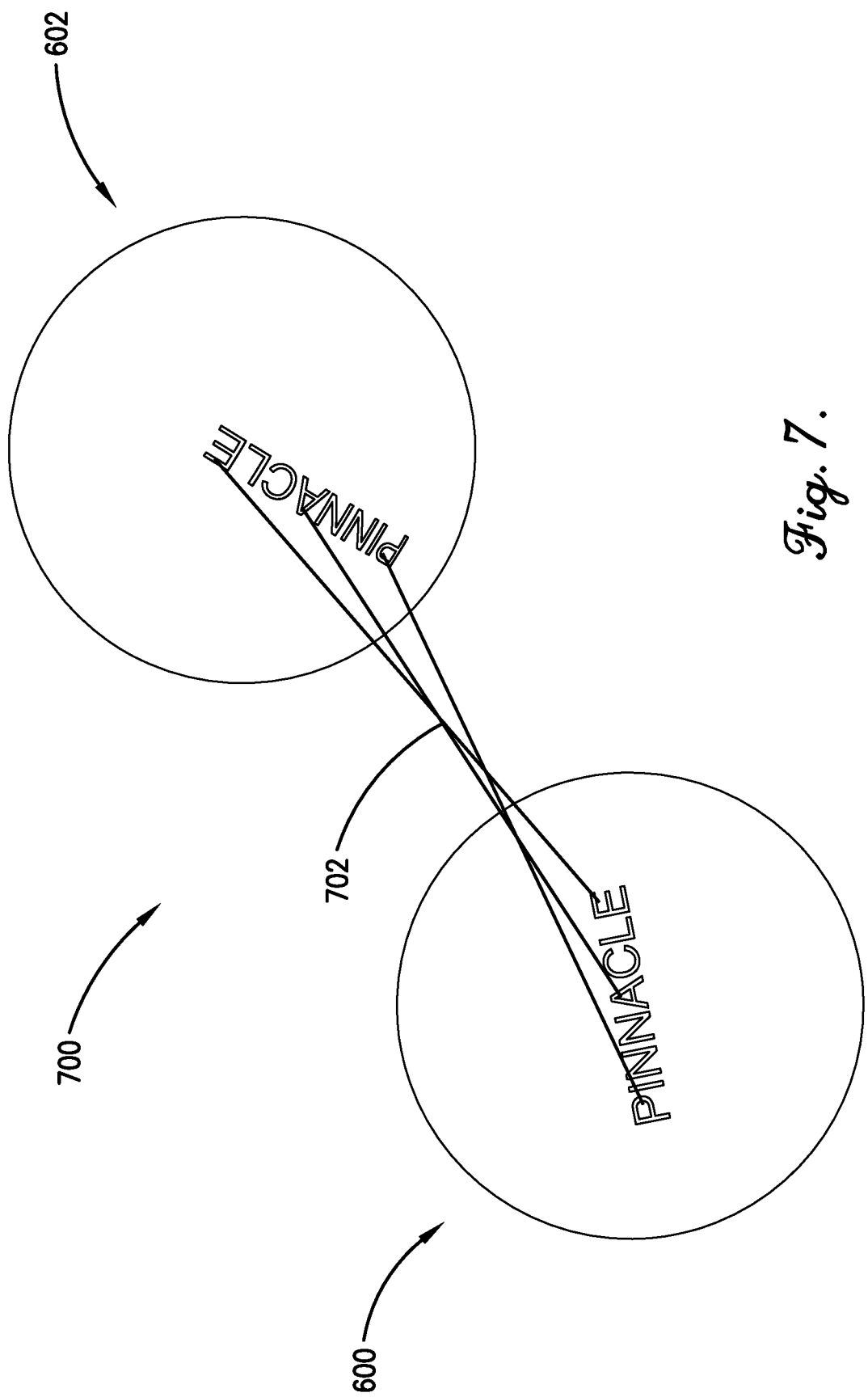
FIG. 7 is a schematic diagram illustrating how the first and second images are compared to analyze flight characteristics of the golf ball.

Turning now to FIG. 7, an exemplary comparison image 700 of the exemplary first image 600 and the exemplary second image 602 is shown. The exemplary comparison image 700 includes three comparative lines 702. The comparative lines 702 tie a portion of the indicium 604 between the exemplary first image and the exemplary second image. It should be appreciated that more or fewer comparative lines 702 may be used in analyzing the rotation of the indicium 604. The comparative lines 702 allow the processing element 350 to determine the amount and direction of the rotation of the golf ball 104, as indicated by the amount and direction of the rotation of the indicium 604 on the golf ball 104. The amount and direction of the rotation of the golf ball 104 affects various flight characteristics, as discussed in more depth below.

In some embodiments, the processing element 350 performs the above-discussed comparison by creating the comparison image. The comparison image enables the processing element 350 to determine the amount and direction of the rotation of the indicium 604. In other embodiments, the processing element 350 measures the relative locations of the indicium 604 in performing the analysis, without producing or analyzing the comparison image.

In Step 416, the processing element 350 determines one or more flight characteristics based at least in part on the comparison of the first image and the second image. In some embodiments, the golfer 102 (or other user) may request, via the graphical user interface, specific flight characteristics. In other embodiments, various characteristics will be calculated based upon the available information. Various flight characteristics and their calculation will now be briefly described.

A first example flight characteristic is ball launch angles (azimuth and elevation). Ball launch angles describe the initial flight path of the golf ball 104 after the strike. The azimuth is the lateral direction of the ball launch. The azimuth may be measured relative to the Earth (e.g., a heading, as measured via the magnetic compass 368) or relative to the hybrid golf launch monitor 100 (e.g., with straight being perpendicular to the field of view of the first camera 352 and second camera 354). The azimuth may be measured, at least in part, upon a change in apparent size of the golf ball 104 between the first image and the second image, being indicative of whether the golf ball 104 is moving toward or away from the hybrid golf launch monitor 100. The elevation is the vertical direction of the ball launch. The elevation may be measured as an upward angle relative to horizontal or some other reference. The elevation may be measured, at least in part upon the relative positions of the golf ball 104 in the first image and the second image. The vertical and horizontal change in position is indicative of the amount of elevation imparted on the golf ball 104 by the strike.

A second example flight characteristic is ball launch speed. The ball launch speed is the amount of speed imparted on the golf ball 104 by the strike. The speed may be measured based upon a linear distance between the golf ball 104 in the first image and the second image, in relation to the interval time. The ball launch speed, in combination with one or both of the ball launch angles, may be referred to as ball launch velocity.

A third example flight characteristic is ball spin. The ball spin affects the future flight characteristics of the ball flight (e.g., hooking or slicing). The ball spin may include a spin rate and/or a spin direction. The spin rate is a measure of the amount or rate of spin imparted on the golf ball 104 by the strike. Spin is imparted by the striking of a non-perpendicular club face. The spin direction is a measure of a spin axis about which the golf ball 104 is spinning. The spin axis may have components of back/topspin and sidespin. This is because back/topspin will affect the flight characteristics independently of the sidespin. The ball spin is determined by analyzing one or more indicium 604 on the golf ball 104. Typically, the golfer 102 will face the indicium 604 toward the hybrid golf launch monitor 100 before striking the golf ball 104, such that the first camera 352 and the second camera 354 can capture two consecutive images showing the indicium 604.

Environmental considerations may also be analyzed in determining the flight characteristics. Some environmental information may be provided from the location-determining element 366, which may provide information such as elevation. Some environmental information may be provided from the external computing device, such as a smart phone of the user providing wind, temperature, humidity, and other weather information. Some environmental information may be provided by the user via the graphical user interface, such as current conditions, ball make and model, etc.

In Step 418, the processing element 350 provides resultant feedback based upon the flight characteristics. In some embodiments, the resultant feedback is indicative of the reasoning for the various flight characteristics. This reasoning may be directly measured or determined based upon the flight characteristic. For example, as shown in FIG. 2, the resulting flight characteristic can be utilized to diagnose the underlying cause of the that flight characteristic. Golfers and others (such as coaches and club fitters) may utilize these further metrics about the swing. These swing metrics include club speed, club path (e.g., the horizontal angle relative to the desired direction), club attack angle (e.g., the vertical angle relative to the horizontal), and club face orientation (which is free in three dimensions—lie angle, loft angle, face angle).

In some embodiments, the processing element 350 accesses location information from the location-determining component and associating the location information with data for the sensed swing characteristics. The ball flight data may be calculated based on the approximate start position and the approximate rest position of the golf ball 104 and may include, for example, a driving distance or other distance of the golf ball 104; an angle between the approximate start position and approximate rest position of the golf ball 104; a distance between the approximate rest position of the golf ball 104 and a fairway; a distance between the approximate rest position of the golf ball 104 and a green; a distance between the approximate rest position of the golf ball 104 and a portion of a green; a distance between the approximate rest position of the golf ball 104 and a flagstick; or a distance between the approximate rest position of the golf ball 104 and a hazard.

In some embodiments, the processing element 350 may associate the ball flight data with the swing characteristic data by storing the data together in memory, linking the data in memory, displaying representations of the data together, or by any other method. In some embodiments, the computing device may also associate the ball flight data and swing characteristic data by creating a reference profile for a golfer 102 based on the ball flight data and the swing characteristic data for a plurality of golf swings. The computing device may also associate ball flight data and/or swing characteristic data with particular golf clubs.

In some embodiments, the processing element 350 may also associate a particular golf club, or type of golf club, with the swing characteristic data and the ball flight data. An identification of a type of golf club may be manually input via the graphical user interface or otherwise selected by the golfer 102 or other user of the device. Alternatively, the computing device may automatically sense the type of golf club by reading an identifier on or in the golf club 106. For example, each golf club 106 may be equipped with an RFID tag or similar device that identifies the golf club 106 and any characterizing information.

In some embodiments, the processing element 350 will accumulate swing characteristic data and ball flight data for a plurality of golf swings and then create a user profile for a golfer 102. The user profile may include representative swing characteristics exhibited by the golfer 102, the frequency of each of the swing characteristics, and the cumulative results of the shots. The user profile may include a field or line identifying the golfer 102 and a field or line indicating the date or date range for the golf swings represented in the database.

Graphical User Interfaces

It is to be understood that any information presented may be on the display 316 of the hybrid golf launch monitor 100, on a display of another computer system, on a mobile device (e.g., tablet or smart phone), or on another display. It is also to be understood that some information may be shown on the hybrid golf launch monitor 100 while other information is shown on another device.

In some embodiments of the invention, the user interface generally allows the user to utilize inputs and outputs to interact with the hybrid golf launch monitor 100. Inputs may include buttons, pushbuttons, knobs, jog dials, shuttle dials, directional pads, multidirectional buttons, switches, keypads, keyboards, mice, joysticks, microphones, touchscreens, or the like, or combinations thereof. Outputs may include lights, dials, meters, or the like, or combinations thereof. With the user interface, the user may be able to control the features and operation of the display 316. Additional user feedback and output may be provided via the speaker 372 or other audible devices. In other embodiments, the user interface does not allow the user to utilize inputs and outputs at certain times, such as during a swing.

The user interface may comprise one or more functionable inputs such as buttons, switches, scroll wheels, a touch screen associated with the display 316, voice recognition elements such as a microphone (such as microphone 358 or other microphone), pointing devices such as mice, touchpads, trackballs, styluses, a camera such as a digital or film still or video camera, combinations thereof, etc. Further, the user interface 22 may comprise wired or wireless data transfer elements such as removable memory including the memory 20, data transceivers, etc., to enable the user and other devices or parties to remotely interface with the device. The device may also include a speaker for providing audible instructions and feedback.

The user interface may be operable to provide various information to the user utilizing the display 316 or other visual or audio elements such as a speaker. Thus, the user interface enables the user and device to exchange information relating to the hybrid golf launch monitor 100, including golfer information, club information, swing information, geographic entities, configuration information, security information, preferences, golf course and/or driving range information, points of interests, alerts and alert notification, etc.

Although the technology has been described with reference to the embodiments illustrated in the attached drawing figures, it is noted that equivalents may be employed, and substitutions made herein without departing from the scope of the technology as recited in the claims.

Having thus described various embodiments of the technology, what is claimed as new and desired to be protected by Letters Patent includes the following:

1. A golf launch monitor configured to determine a flight characteristic of a golf ball, comprising:
    a memory device storing a club head speed;
    a first camera having a first frame rate, configured to capture a first ball image and having a first field of view;
    a second camera spaced laterally from the first camera, the second camera having a second frame rate, configured to capture a second ball image and having a second field of view, the second field of view being different from the first field of view;
    a trigger device configured to detect a golf swing; and
    a processor communicatively coupled with the memory device, the first camera, the second camera and the trigger device, the processor configured to:
        determine, based on the club head speed, a time interval after which the golf ball will be present in the second field of view once the golf ball is struck by a golf club,
        instruct, based on the trigger device detecting said golf swing, the first camera to capture the first ball image,
        instruct the second camera to capture the second ball image after the determined time interval, and
        determine, based at least in part on the first ball image and the second ball image, the flight characteristic of the golf ball;
    wherein the determined time interval is less than time periods associated with the first frame rate and the second frame rate, respectively.

2. The golf launch monitor of claim 1, wherein the time interval is fixed.

3. The golf launch monitor of claim 1,
    wherein the time interval is dynamic,
    wherein the time interval is determined at least in part on a swing speed of the detected golf swing.

4. The golf launch monitor of claim 1, wherein the first frame rate of the first camera is equal to the second frame rate of the second camera.

5. The golf launch monitor of claim 1, wherein the first frame rate and the second frame rate are both less than one-hundred and fifty frames per second.

6. The golf launch monitor of claim 1,
    wherein the processor is further configured to store the first ball image from the first camera in the memory device,
    wherein the processor is further configured to store the second ball image from the second camera in the memory device.

7. The golf launch monitor of claim 1, wherein the determined flight characteristic is indicative of at least one of ball launch angle, ball launch speed, ball spin rate, and ball spin direction.

8. The golf launch monitor of claim 1,
    wherein the trigger device is a microphone,
    wherein the microphone is configured to detect a sound generated by the golf club striking the golf ball,
    wherein the processor is further configured to instruct the first camera to capture the first ball image immediately.

9. The golf launch monitor of claim 1,
    wherein the trigger device is a radar configured to detect a radar signature of the golf swing,
    wherein the processor is further configured to calculate the club head speed and an impact time of the golf ball being struck by the golf club based upon the radar signature, and
    wherein the first camera is instructed to capture the first ball image at the calculated impact time.

10. The golf launch monitor of claim 1, further comprising:
    a housing;

a display secured to the housing, wherein the processor is further configured to show, on the display, information indicative of the determined flight characteristic of the golf ball.

11. The golf launch monitor of claim 10, wherein the processor is further configured to show, on the display, information indicative of a simulated game.

12. A golf launch monitor configured to determine a flight characteristic of a golf ball, comprising:

a memory device storing a club head speed;

a first camera configured to capture a first ball image and having a first field of view, the second field of view being different from the first field of view;

a second camera spaced laterally from the first camera and configured to capture a second ball image having a second field of view;

a microphone configured to detect a sound generated by a golf club striking the golf ball; and a processor communicatively coupled with the memory device, the first camera, the second camera and the microphone, the processor configured to:

determine, based on the club head speed, a time interval after which the golf ball will be present in the second field of view once the golf ball is struck by a golf club, instruct, upon the microphone detecting said sound, the first camera to capture the first ball image;

instruct the second camera to capture the second ball image after the determined time interval; and determine, based at least in part on the first ball image and the second ball image, the flight characteristic of the golf ball.

13. The golf launch monitor of claim 12, wherein the first camera and the second camera have a frame rate, and wherein the determined time interval is less than a time period associated with the frame rate.

14. The golf launch monitor of claim 12, wherein the processor is further configured to store the first ball image from the first camera in the memory device, wherein the processor is further configured to store the second ball image from the second camera in the memory device.

15. The golf launch monitor of claim 12, further comprising:

a housing;

a display secured to the housing, wherein the processor is further configured to show, on the display, information indicative of the determined flight characteristic of the golf ball, wherein the processor is further configured to show, on the display, information indicative of a corrective swing action that a golfer can take to improve the flight characteristic.

16. A golf launch monitor configured to determine a flight characteristic of a golf ball and a swing characteristic of a golf swing, comprising:

a first camera having a first frame rate, configured to capture a first ball image and having a first field of view;

a second camera spaced laterally from the first camera, the second camera configured to capture a second ball image and having a second frame rate and a second field of view, the second field of view being different from the first field of view;

a radar configured to detect a golf swing;

a microphone configured to detect an impact; and a processor communicatively coupled with the first camera, the second camera, the radar and the microphone, the processor configured to:

determine the club head speed based on the golf swing detected by the radar, determine, based on the determined club head speed, a time interval after which the golf ball will be present in the second field of view once the golf ball is struck by a golf club, instruct the first camera to capture a pre-strike image, instruct, upon the detected impact, the second camera to capture a post-strike image, determine, based at least in part on the pre-strike image and the post-strike image, the flight characteristic of the golf ball, and determine, based at least in part on the detected golf swing, the swing characteristic of the golf swing;

wherein the determined time interval between the detected impact and the capture of the post-strike image is less than time periods associated with the first frame rate and the second frame rate, respectively.

17. The golf launch monitor of claim 16, wherein the first frame rate and the second frame rate are less than one-hundred and fifty frames per second.

18. The golf launch monitor of claim 16, further comprising:

a memory device communicatively coupled with the processor, wherein the processor is further configured to store the pre-strike image and the post-strike image from the first camera and the second camera, respectively, in the memory device.

19. The golf launch monitor of claim 16, wherein the microphone is configured to detect the impact by detecting a sound generated by the golf club striking the golf ball.

20. The golf launch monitor of claim 16, wherein the radar is configured to detect the golf swing by detecting a radar signature of the golf club, and wherein the microphone detects the impact at least in part based upon the detected golf swing.

21. The golf launch monitor of claim 1, wherein the lateral space between the first camera and the second camera is approximately eight inches.

22. The golf launch monitor of claim 12, wherein the lateral space between the first camera and the second camera is approximately eight inches.

23. The golf launch monitor of claim 12, further comprising a radar configured to detect a radar signature of a golf swing, wherein the processor is further configured to calculate the club head speed based upon the radar signature.

24. The golf launch monitor of claim 16, wherein the lateral space between the first camera and the second camera is approximately eight inches.

* * * * *